United States Patent [19]

Wolf et al.

[11] 4,084,409
[45] Apr. 18, 1978

[54] FLEXIBLE COUPLING FOR ROTATABLE SHAFTS

[75] Inventors: John C. Wolf, New Fairfield, Conn.; Thomas G. Costello, Fishkill, N.Y.

[73] Assignee: Controlex Corporation of America, Croton Falls, N.Y.

[21] Appl. No.: 683,910

[22] Filed: May 6, 1976

[51] Int. Cl.$^2$ .............................................. F16D 3/52
[52] U.S. Cl. .................................................. 64/11 B
[58] Field of Search ................... 64/11 R, 11 B; 92/45

[56] References Cited

U.S. PATENT DOCUMENTS

| | | | |
|---|---|---|---|
| 2,628,638 | 2/1953 | Herod | 251/335 B UX |
| 2,822,676 | 2/1958 | Horovitz | 64/11 R |
| 2,852,041 | 9/1958 | Stinson | 251/335 B |
| 3,046,759 | 7/1962 | Deford | 64/11 R |
| 3,455,013 | 7/1969 | Rayburn | 92/45 X |
| 3,707,082 | 12/1972 | Ulics | 64/11 B |

Primary Examiner—Alan Cohan
Attorney, Agent, or Firm—Paul W. Garbo

[57] ABSTRACT

A flexible coupling for rotatable shafts in the form of a metal bellows features a concentric sleeve which is fastened to one end of the coupling and which terminates in a plurality of fingers or keys projecting into, but without contact with, slots in the opposite end of the coupling. In normal use, the coupling transmits rotary motion from one shaft to the other shaft solely through the connecting bellows which provides the flexibility required for small amounts of misalignment and obliqueness of the coupled shafts. If the bellows broke, the concentric sleeve would function as the fail-safe coupling member to continue the transmission of the rotary motion.

8 Claims, 4 Drawing Figures

FLEXIBLE COUPLING FOR ROTATABLE SHAFTS

BACKGROUND OF THE INVENTION

This invention relates to a flexible coupling for rotatable shafts which incorporates back-up or fail-safe coupling means for the continuance of the transmission of rotary motion in the event of failure of the primary coupling means during the rotation of the drive shaft.

Numerous rotary shaft couplings have been developed or proposed but none has been found entirely satisfactory for certain critical uses having imposed limitations of weight, compactness and reliability as well as requirements of minimum lost motion and resistance to large temperature swings. Such critical use of rotary shaft couplings is encountered, for example, in aircraft engines where the couplings are exposed to vibration and must be flexible enough to accommodate small deviations from perfect alignment of the coupled shafts. In such critical use, a fail-safe construction is very desirable if not imperative.

Accordingly, the object of this invention is to provide a fail-safe flexible coupling for rotary shafts meeting unusual physical and performance requirements.

SUMMARY OF THE INVENTION

In accordance with this invention, a flexible coupling for rotary shafts comprises a metal bellows as the primary coupling means and a concentric metal sleeve fastened to and extending from one end of the coupling to the opposite end where a plurality of fingers or keys project from the free end of the sleeve into slots formed in the opposite end of the coupling without these keys contacting the slots so long as the metal bellows does not rupture. In the event of failure of the metal bellows, the keys of the sleeve come with a slight lost motion into engagement with the sides of their respective slots and thus the coupling continues to transmit rotary motion from one shaft to the other through the sleeve. The bellows and sleeve are so dimensioned that they do not contact one another so long as the bellows has not failed.

For a fuller understanding of the invention, reference is now made to the accompanying drawings.

DESCRIPTION OF PREFERRED EMBODIMENTS

Figure 1:
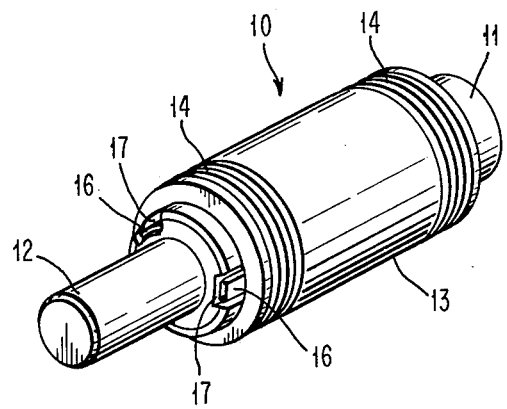
FIG. 1 is a perspective view of a preferred embodiment of the coupling of this invention.
Figure 2:
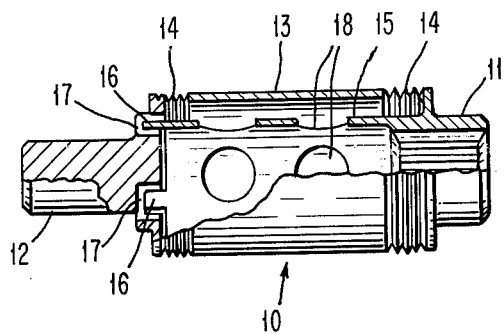
FIG. 2 is a side view, partially in section, of the coupling shown in FIG. 1.

Flexible coupling 10 shown in FIGS. 1 and 2 comprises female connector end 11 and male connector end 12 joined to one another by metal bellows 13. In the preferred form shown, metal bellows 13 has corrugations 14 only adjacent its ends which are attached to connectors 11 and 12. However, corrugations 14 may extend over the entire length of bellows 13 or over part of the length, for example, over the middle portion of bellows 13. Coupling 10 also comprises inner sleeve 15 which is an integral part of connector 11 and which extends concentrically within bellows 13 toward connector 12. The free end of inner sleeve 15 has three equally spaced finger-like elements or keys 16 projecting into three slots 17 formed in connector 12. Inner sleeve 15 and keys 16 are so dimensioned that in the normal operation of coupling 10 they do not contact bellows 13 and slots 17, respectively. Only if bellows 13 should rupture, will keys 16 with a slight lost motion come into contact with slots 17. Thus keys 16 will engage slots 17 to continue the transmission of the rotary motion of one shaft to the other through inner sleeve 15. To mimimize weight, inner sleeve 15 has several cutouts 18 shown in FIG. 2 as eight circular perforations.

Figure 4:
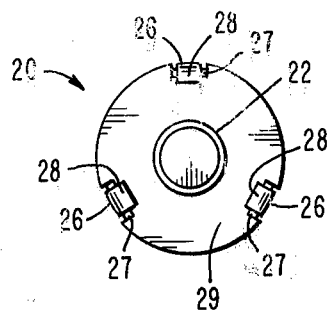
FIG. 4 is a left end view of the coupling show in FIG. 3.
Figure 3:
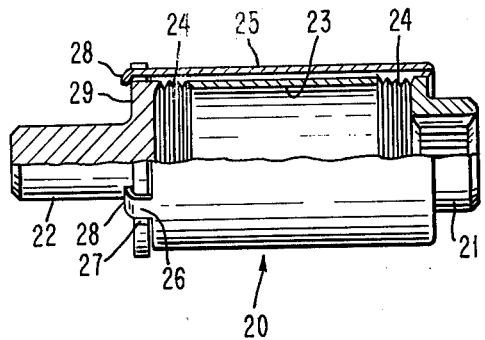
FIG. 3 is a side view, partially in section, of another preferred embodiment of the coupling of this invention.

Flexible coupling 20 shown in FIGS. 3 and 4 is similar to coupling 10 of FIGS. 1 and 2, the principal difference being that the concentric bellows and fail-safe sleeve have reversed their positions relative to one another. In coupling 20, female connector end 21 and male connector end 22 are joined to one another by metal bellows 23 having corrugations 24 only adjacent its ends, and metal sleeve 25 is disposed around bellows 23. One end of sleeve 25 is welded or otherwise suitably fastened to connector 21 while its opposite free end has three equally spaced keys 26 projecting into three slots 27 formed in connector 22. Each key 26 has its free end bent into a tab 28 substantially at right angles to key 26. Thus, the three tabs 28 would prevent keys 26 from slipping out of slots 27 in the event that bellows 23 broke and connector 21 had the possibility of moving axially away from connector 22. Tabs 28 extend over face 29 of connector 22 without making contact therewith so long as bellows 23 does not rupture.

The coupling of this invention provides a unitary metal connection between two rotatable shafts which is sufficiently flexible because of the metal bellows disposed between the ends of the coupling to permit slight deviations from concentricity and parallelism of the two coupled shafts. For example, the coupling of the invention will give satisfactory performance with two one-half inch diameter shafts the axes of which lack both concentricity by about one-sixteenth inch and parallelism by about 1° angularity.

While the coupling may be made of various metals and alloys, stainless steel is generally preferred because of its strength even at elevated temperatures and its resistance to corrosion.

Those skilled in the art will visualize variations of the invention without departing from its spirit and scope. For instance, female connector end 11 and male connector 12 may reverse their positions in coupling 10 or both ends of coupling 10 may be either female connectors 11 or male connectors 12. While bellows 13 and 23 have been shown with the preferred corrugations 14 and 24 of the type made by welding together metal contoured diaphragms, the bellows may be of the tubular type with sinusoidal rather than pleated corrugations. Such alternative bellows are often referred to as the convoluted hose type. Also, tabs 28 may be replaced by pins projecting at right angles through the free ends of keys 26. Outer sleeve 25 like inner sleeve 15 may have several cutouts to reduce its weight. Accordingly, only such limitations should be imposed on the scope of the invention as are set forth in the appended claims.

What is claimed is:

1. A flexible coupling for rotatable shafts which comprises a metal bellows as the primary connecting element between the two ends of said coupling, said bellows having corrugations disposed only adjacent said two ends of said coupling, and a concentric sleeve attached to one of said ends and extending toward the other of said ends, said other end having a plurality of slots and the free end of said sleeve having a plurality of keys projecting into said slots without making contact therewith so long as said bellows is not ruptured, and said sleeve being disposed out of contact with said bellows.

2. The flexible coupling of claim 1 wherein the corrugations of the metal bellows are made of contoured diaphragms welded together.

3. The flexible coupling of claim 2 wherein the metal bellows is made of stainless steel.

4. The flexible coupling of claim 1 wherein the concentric sleeve has three keys equally spaced from one another.

5. The flexible coupling of claim 4 wherein the metal bellows is made of stainless steel.

6. The flexible coupling of claim 1 wherein the concentric sleeve is disposed within the metal bellows.

7. The flexible coupling of claim 1 wherein the keys have means to prevent the disengagement of said keys from the slots.

8. The flexible coupling of claim 1 wherein the metal bellows is disposed within the concentric sleeve having three keys equally spaced from one another and the corrugations of said bellows are made of contoured diaphragms welded together.

* * * * *